March 10, 1936.  D. D. HOEFLER  2,033,378
SIGNAL FOR AUTOMOBILES AND THE LIKE
Filed May 19, 1933
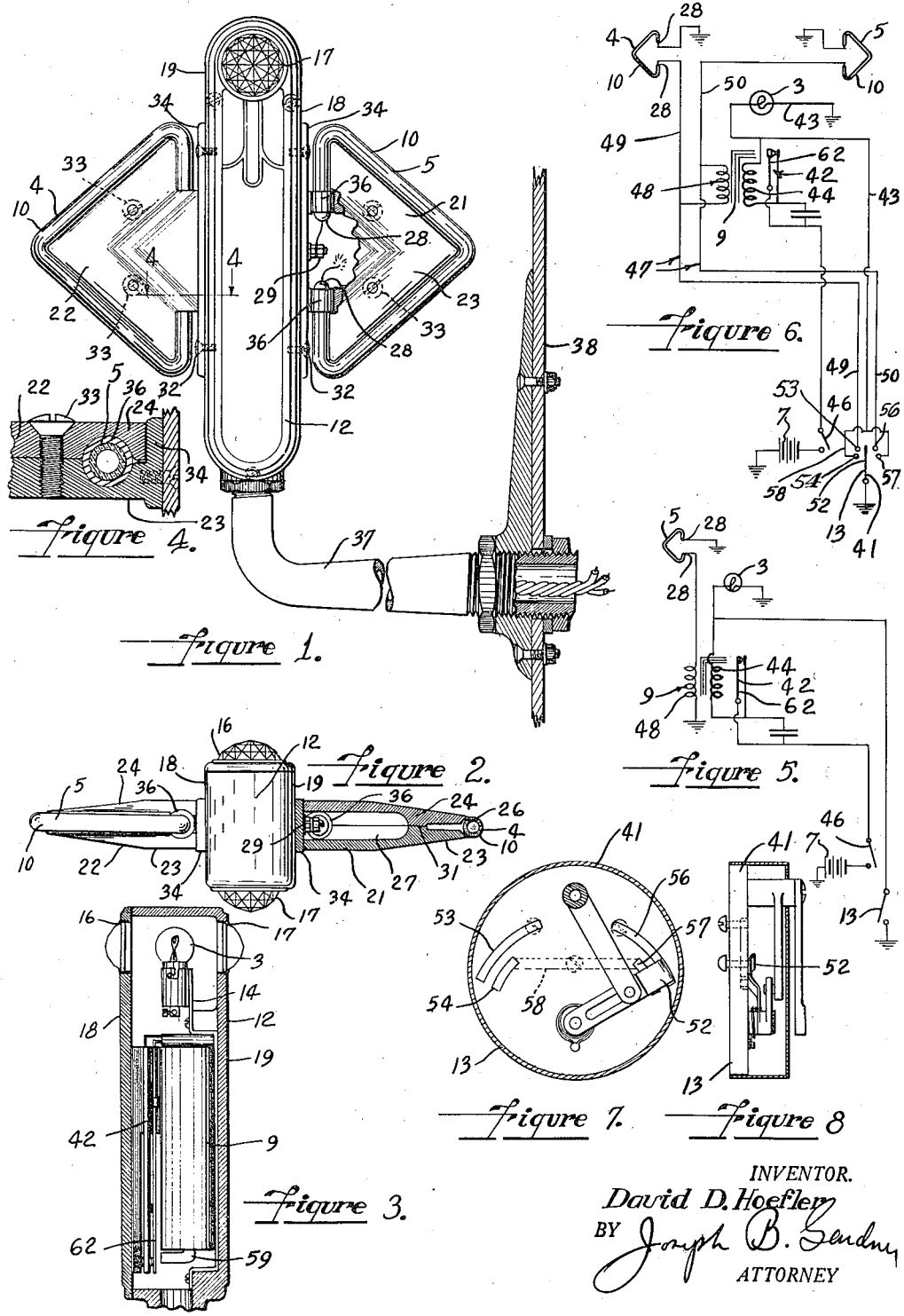
INVENTOR.
David D. Hoefler
BY Joseph B. Gardner
ATTORNEY Patented Mar. 10, 1936

2,033,378

UNITED STATES PATENT OFFICE 2,033,378

SIGNAL FOR AUTOMOBILES AND THE LIKE

David D. Hoefler, San Leandro, Calif.

Application May 19, 1933, Serial No. 671,807

2 Claims. (Cl. 177—339)

The invention relates to signals arranged for mounting on an automobile and controllable by the driver to indicate to pedestrians and to drivers of approaching vehicles of the intention of the first driver to turn or otherwise change the course or state of movement of the vehicle.

An object of the invention is to provide a signal with different signal portions, one of which by the location of the signal on the vehicle tends to attract to the signal the continued attention of drivers of approaching vehicles so that when a change of motion or direction is contemplated by the operator of the vehicle on which the signal is mounted, another of said signal portions, when actuated in place of or to the effacement of the first portion, will always and instantaneously come to the notice of the approaching drivers.

Another object of the invention is to provide a signal with the different signal portions as aforesaid, in which the signal portion indicating a change in direction or the like is of a nature and design not only affording considerable brilliance when actuated but indicating clearly and from many angles of observation the direction of movement purposed to be taken by the operator of the signal.

A further object of the invention is to provide a signal with a gaseous discharge lamp arranged to be energized from the usual automobile battery, and having as a part of the signal a housing which contains in very compact form the means of converting the low battery voltage to a high voltage for the lamp and is so formed and designed that while affording an effective guard for the lamp offers little wind resistance and does not to an appreciable extent impair the visibility of the lamp from the front or rear of the vehicle.

A still further object of the invention is to provide a signal of the character described in which the gaseous lamp aforesaid is so carried thereby that the vibration to which the vehicle is subjected will not affect the lamp, and at the same time the lamp will be firmly supported and shielded and may be replaced with extreme readiness when necessary and without requiring the dismantling of the signal body.

Yet another object of the invention is to provide a signal in which signal portions for indicating different directions may be readily attached to or detached from the signal body to afford as desired either a one-way or multi-way direction indicating unit.

A still further object is to provide a selective multi-way direction signal utilizing different signal lights of high tension current, in which the initiation or interruption of operation of either of the signal lights aforesaid takes place in a manner eliminating all danger of arcing, affording the use of an additional signal light, and permits, with the use of a single-wire circuit branch, the turning on or off of one of the direction-indicating lights and the simultaneous turning off or on of said additional signal lamp.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side view, partly in section, of the signal of my invention as equipped with two-way direction indicating portions and designed for attachment to the wind shield post or the like of an automobile.

Figure 2 is a plan view of the signal as illustrated in Figure 1.

Figure 3 is a vertical sectional view of the signal taken at right angles to Figure 1.

Figure 4 is a detail transverse sectional view taken on the line 4—4 of Figure 1.

Figure 5 is a diagrammatic representation of the electric circuit for a signal with one direction indicating light.

Figure 6 is a view similar to Figure 5, but showing the circuit for two-way direction indicating.

Figure 7 is a front view of the switch used for the arrangement of signal illustrated in Figure 6.

Figure 8 is an end view partly in section of the switch.

The signal in the present embodiment of the invention involves the use of both a low voltage lamp 3 and high voltage lamps 4 and 5, the low voltage lamp being preferably utilized to provide a guide to oncoming drivers of the substantial clearance point of the car on which the signal is mounted, while the high tension lamps are used to indicate the direction in which the operator contemplates making a turn. The high tension electric lamps are preferably of the gaseous discharge type and arranged to be supplied with current in common with the low voltage guide lamp, from a battery 7, such as usually provided on the automobile, the guide lamp conveniently utilizing the same voltage as provided directly by the battery while the high tension lamps draw the current after the voltage is stepped up through means of a make and break induction coil transformer 9.

As here illustrated, the signal includes a body 12 which provides a support for all the lamps and has contained therein the transformer 9 and all the conductor wires, whereby electrical installation of the signal may be effected by merely connecting the few leads from the signal to the automobile battery and the signal control switch 13. Preferably the lamp 3 is also mounted within the signal body or housing 12 and is positioned on a bracket 14 therein disposed above the transformer 9, the housing being provided with aligned openings 16 and 17 in the front and rear walls thereof so that the lamp will be visible from both ends of the car.

The lamps 4 and 5 are here shown located exteriorly of the signal body at the sides of the side walls 18 and 19 thereof, and are of a form simulating the outline of an arrow head with the point disposed outermost and with the broad side lying parallel to the front wall of the body. In this way, since the signal is designed for positioning on the vehicle with all the arrow simulating portion of the lamps visible from the front and rear of the car, the lighting of either of the lamps will indicate the right or the left as the case may be. As a mounting for these lamps there is provided at each of the sides 18 and 19 of the signal body, brackets 21 and 22 which are designed to conform to and extend completely around the inner periphery of the lamps. Each of the brackets is formed of substantially like sections 23 and 24 which together define a groove 26 for the reception of the associated lamp. Likewise each pair of sections provides a cavity 27 on the inside of the bracket which serves to contain the lamp electrode terminals 28 and the transformer connecting post 29. Preferably, as will be clear from Figure 2, the cavity 27 is separated from the groove 26 by contacting portions 31 of the sections, so that the cavity will be fully sealed on all sides. Attachment of the sections together and to the signal body is effected by means of screws 32 and 33, the former serving to secure the integral plate 34 of each section 23 to the side of the body, whereas the screws 33 function to hold each set of the sections together. The lamps, as will also be clear from Figure 2, while partially disposed in the groove 26, preferably do not contact directly with any portion of the brackets but are fitted at their extremities in ring cushions 36 which are held clamped between the bracket sections by the screws 33. Thus it will be clear that the lamps will be firmly held in place yet cushioned against the vibration and shocks of the vehicle. Furthermore, the thickness of the bracket at the lamp reception portion is preferably greater than the thickness of the lamp whereby the bracket will serve as a shield to protect the lamp. In connection with the latter feature may also be mentioned the fact that the lamps are located well inwardly of the upper and lower extremities of the body, as well as considerably inwardly from the front and rear sides thereof, thus further providing an effective shield for the lamps.

While the lamps 14 and 15 and associated parts are, as above explained, constructed and designed to afford effective protection against damage to the lamps, the visibility of the latter is in no way impaired and at the same time a most attractive and distinctive display of the warning signs is provided. In the latter connection attention is directed to the arrangement of each lamp whereby the angularly related portions thereof which diverge from the end simulating the point of the arrow head, extend almost to the top and bottom center of the body and then branch inwardly toward each other along the side walls of the body to terminate with a space between the free ends so as to accentuate the arrow point.

The signal is arranged for mounting on the vehicle so as to be positioned at or near a side edge thereof, and is therefore provided with a suitable bracket or support 37 attached to the body and by which it may be secured in such position. Preferably the support 37 is of a form suitable for connection to the left fender of the vehicle or as here shown to the left corner post 38 of the vehicle top. With the signal thus disposed, each of the signal lights will be visible to any other vehicle or to pedestrians approaching or positioned in front of the vehicle on which the signal is mounted. Normally, when driving straight ahead at night or in inclement weather, the signal will be set with the guide lamp lit up but with both of the direction indicating lights inactive. In this manner, since the guide lamp is located adjacent the extreme left of the vehicle, it will indicate the approximate point on the vehicle to be cleared by the approaching vehicles in passing the former. Thus the driver on the approaching vehicle will invariably keep his eyes concentrated on the guide lamp and as a result should the operator of the signal cause one of the direction indicating lamps 10 to be flashed on, the oncoming driver will be instantly apprised of the other's intention to make a turn. In the present embodiment the guide light is arranged to automatically go off as soon as one of the direction lights goes on. However, if desired the guide lamp may be arranged to remain lighted continuously, since the brilliance of the gaseous discharge lamps when illuminated would by comparison efface the ordinary incandescent type lamp of which the guide lamp is comprised.

Actuation of the signal is designed to be effected thru an electrical circuit such as illustrated in Figure 6, and control is afforded thru means of the switch 41 conveniently arranged for positioning on the instrument panel of the vehicle within easy reach of the driver. Preferably the transformer used for stepping up the voltage for the gaseous discharge lamps, is in the form of an induction coil with a make and break device 42, and in the present embodiment a grounded branch 43 of the circuit has contained therein in series with the low tension winding 44 of the coil the guide lamp 3. The circuit branch 43 has also included therein the breaker points of the device aforesaid, and since such points are normally in contact, the closing of such branch as by a switch 46, will keep the lamp 3 lighted. A branch 47 of the circuit is utilized for the gaseous discharge lamps and includes the secondary winding 48 of the induction coil, which winding is connected across leads 49 and 50 in which the lamps 4 and 5 are respectively inserted. The switch 41 is in effect used for controlling the branch circuit, or more specifically stated, for operating said circuit to cause a flow of current thru either of the lead lines 49 and 50. Included as part of the switch 41, is a grounded switch arm 52 which may be moved to the left from a central neutral position so as to bridge and at the same time ground each of a pair of contacts 53 and 54 which are connected to lamps 4 and 3 respectively, or turned to the right from said central position to bridge and ground each of a pair of contacts 56 and 57 which are connected to lamps 5 and 3 respectively. Connection of contacts 54 and 57 to the lamp 3 is here effected by a conductor 58 which connects the contacts 54 and 57 together and to the branch line 43 between the primary transformer winding and lamp 3, whereby on closing of either pair of contacts by the switch arm 52 the current will by-pass the lamp 3 and ground directly thru conductor 58. With the increased current thus flowing thru the primary on the closing of the contacts, the core 59 of the coil will become sufficiently magnetized to effect the periodic opening and closing of the breaker points and the consequent stepping up of the voltage in the secondary winding 48. In the secondary circuit the high voltage is communicated to one electrode each of the lamps 4 and 5 through the conductors 49 and 50 which, as will be seen from Figure 6, are connected to the opposite terminals of the secondary winding, the opposite electrodes of the lamps be interconnected through a common ground connection to place the lamps 4 and 5 normally in series with the secondary winding. As will be understood, however, grounding of either conductors 49 or 50 by the switch 52 will cause the short circuiting of the connected lamp 4 or 5 and the exclusive energization of the other lamp. Since as aforesaid bridging of either pair of contacts causes the current to by-pass the guide lamp 3, the latter will thus automatically become extinguished as either of the direction indicating lamps become lighted, and conversely, when the switch arm is returned to neutral position the guide lamp will light up and the direction lamp will go out. To insure completion of the circuit thru the secondary winding before the lamp 3 is cut out, and to thus prevent arcing, the contacts 53 and 56 are elongated as shown in Figure 7 to engage and disengage the switch arm 52 respectively ahead of and after the corresponding engagement and disengagement of contacts 54 and 57.

In order to reduce the length of the body, the lower end portion of the magnetic core of the induction coil is bent so as to permit the armature 62 of the making and breaking device to be disposed vertically within the body alongside the coil instead of at the bottom thereof.

I claim:

1. A signal operable from a source of low electrical potential, an induction coil and interrupter therefor, a low potential guide lamp connected in series with the coil primary winding for connection to said source and incurring a potential drop therethrough sufficient to render said interrupter inoperable, a high potential signal lamp connected to the coil secondary winding, and means for short circuiting said guide lamp for extinguishing the same and for applying the full potential of said source to said primary winding and thereby operating said interrupter and energizing said signal lamp.

2. A signal arranged for operation from source of relatively low electrical potential comprising, an induction coil having low and high voltage windings, an interrupter operable upon application of the full potential of said source across said low voltage winding, a lamp connected in series with said low voltage winding for connection to said source and providing a voltage drop sufficient to prevent operation of said interrupter, a pair of high voltage signal lamps operable from the voltage of said high voltage winding, and a control switch connected to said signal lamps and high voltage winding and to said first lamp and arranged to short circuit said last named lamp while selectively connecting either of said signal lamps to said high voltage winding.

DAVID D. HOEFLER.